UNITED STATES PATENT OFFICE.

JULIUS FRANSECKY, OF EAST NEW YORK, N. Y.

COMPOSITION OF MATTER FOR GIVING A METALLIC SURFACE TO PAPER.

SPECIFICATION forming part of Letters Patent No. 299,372, dated May 27, 1884.

Application filed December 10, 1883. (Specimens.)

*To all whom it may concern:*

Be it known that I, JULIUS FRANSECKY, of East New York, in the county of Kings and State of New York, have invented a new and Improved Composition of Matter for Giving a Metallic Surface to Paper and other Surfaces, of which the following is a full, clear, and exact description.

My composition consists of the following ingredients, combined in the proportions stated, viz: argentine, (wet,) one pound; vermilion, three tea-spoonfuls; silver-bronze, one tea-spoonful; glue, one tea-spoonful; water, one quart. These ingredients are to be mixed and heated to the boiling-point, with constant stirring, and the compound is to be applied to the surface to be given a metallic luster or coating with a fine brush and allowed to dry, and after drying the surface is then first to be brushed and then burnished with a fine cloth, blood-stone, or other fine material.

Having thus described my invention, I claim as new and desire to secure by Letters Patent—

The herein-described composition, consisting of argentine, vermilion, silver-bronze, glue, and water, in about the proportions stated.

JULIUS FRANSECKY.

Witnesses:
H. A. WEST,
C. SEDGWICK.